Sept. 13, 1938.        J. M. BRYANT        2,130,063
COTTER FOR ROLLER CHAINS
Filed Sept. 28, 1936
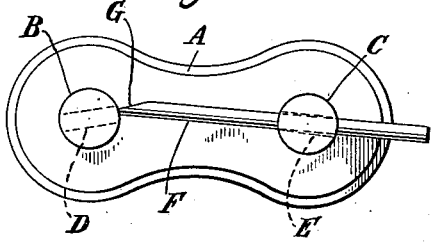
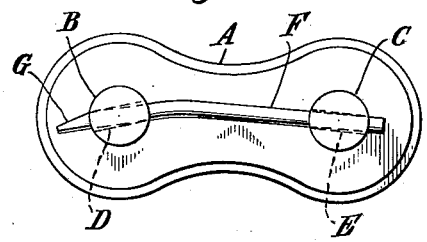
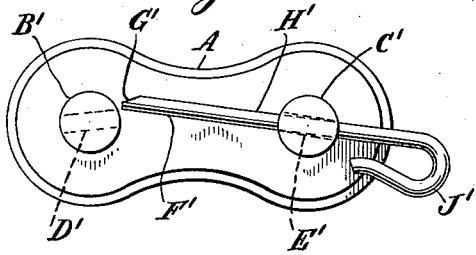
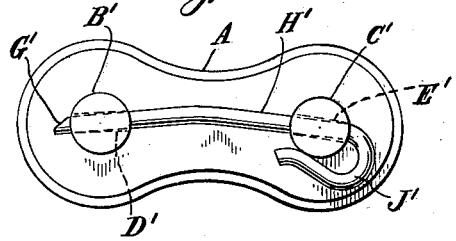
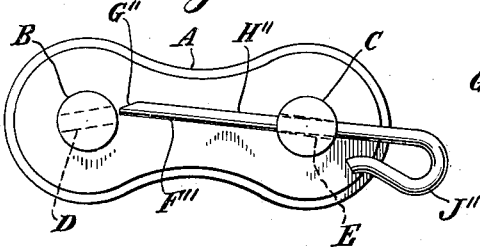
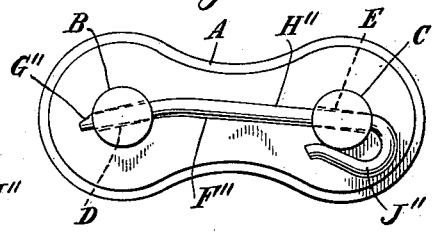
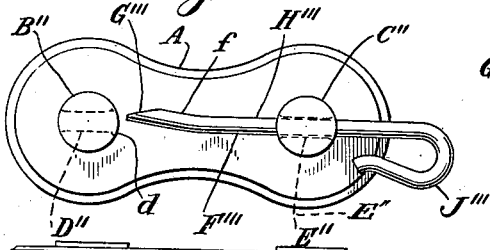
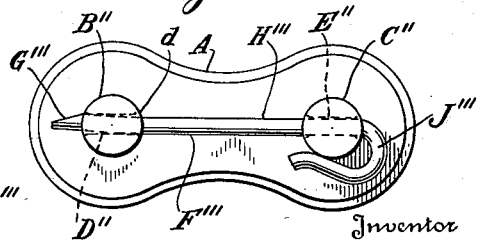
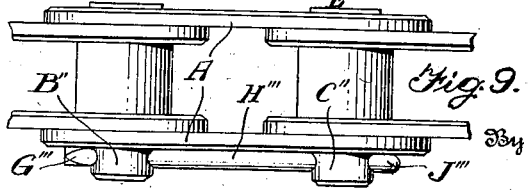
Inventor
Jerrus M. Bryant
By L. Donald Myers
Attorney Patented Sept. 13, 1938

2,130,063

UNITED STATES PATENT OFFICE 2,130,063

COTTER FOR ROLLER CHAINS

Jerrus M. Bryant, Indianapolis, Ind., assignor to Link-Belt Company, a corporation of Illinois Application September 28, 1936, Serial No. 103,017

8 Claims. (Cl. 74—251)

This invention relates to new and useful improvements in cotters for roller chains, and is particularly useful in connection with drive chains used on truck installations.

It is a well recognized fact that after a roller chain is operated for a short period of time at high speeds on the drive transmissions of truck installations, the present standard type of cotter has become worn to such an extent that it falls out of the chain. It furthermore is well known, by those versed in roller chain constructions and operations, that the outer sidebars of roller chains, that is the sidebars at the cotter ends of the chain or pintle pins, are press fitted to the pins with ample tightness to normally prevent axial rotating movement of the outer sidebars with respect to the pins and; consequently, there is little need for cotters to retain the outer sidebars on the pins. Of course, there are times when chains have been used beyond the normal point where replacement is advisable and in such cases the sidebars may tend to move axially of the pins and the cotters then serve to keep the sidebars in assembled relation with respect to the chain or pintle pins. Because of the possibility of high speed drive chains of the type with which this invention deals being used beyond their period of normal replacement and further because of the psychological effect upon the individual who is not well acquainted with chain constructions of this character, it is essential that such drive chains be provided with cotters.

It is the primary object of this invention to provide cotters for high speed drive chains of the roller type which are of very simple form and which are adapted to be quickly and easily applied to and removed from the chains yet which are firmly held in place without the necessity of any manipulation other than the mere insertion of the cotters in the pin holes provided to receive the same.

A further important object of the invention is to provide a single cotter, formed of resilient material, which is adapted to cooperate with both pintle pins of a single link and will be firmly held in place by spring pressure resulting from the deflection of the cotter when inserted in the holes of both pins with which it is to be used.

Other objects and advantages of the invention will be apparent during the course of the following description.

In the accompanying drawing forming a part of this specification and in which like numerals are employed to designate like parts throughout the same, Figures 1 and 2 disclose in side elevation one form of cotter embodying this invention and illustrated in the respective figures in partially and fully assembled relations, Figures 3 and 4 disclose in side elevation a modified form of cotter embodying this invention and illustrated in the respective figures in partially and fully assembled relations, Figures 5 and 6 disclose in side elevation a further modified form of cotter embodying this invention and illustrated in the respective figures in partially and fully assembled relations, Figures 7 and 8 disclose in side elevation a further modified form of cotter embodying this invention and illustrated in the respective figures in partially and fully assembled relations, and Figure 9 is a plan view of a section of roller chain with the form of cotter shown in Figs. 7 and 8 used therein.

In the drawing, wherein for the purpose of illustration are shown the preferred embodiments of this invention, Figures 1 to 8 inclusive illustrate the different forms of the invention by disclosing one sidebar with its pair of retaining pins and a single cotter. It is to be understood, however, that these elements are to form a part of a complete roller chain assembly with the necessary second sidebar for each link assembly illustrated and with the remaining, necessary link assemblies to form the complete chain, as shown in Figure 9.

Referring particularly to the form of the invention illustrated in Figs. 1 and 2, the reference character (A) designates in its entirety one sidebar of the straight or flat type intended to be used as a part of a complete roller chain assembly. This sidebar has projecting from the outer face thereof a chain or pintle pin (B) and a second chain or pintle pin (C). The chain or pintle pin (B) has formed therein a cotter hole (D) which is set at an acute angle with respect to the center line passing through both of the chain or pintle pins (B) and (C). The chain or pintle pin (C) is provided with a cotter hole (E) which is set at such an angle as to cause it to be aimed directly at the near or inner end of the cotter opening (D) formed in the pin (B). A straight cotter, (F), formed of suitable length from a piece of spring steel wire of proper gauge, is provided with a tapered outer extremity (G). With the cotter holes (D) and (E) arranged in the angles described, the tapered extremity (C) of the pin will readily enter the inner or adjacent end of the cotter hole (D) when positioned as illustrated in Fig. 1. By driving the cotter into its final, fully assembled position, the outer end portion, or the end having the tapered extremity, will be crimped or deflected as illustrated in Fig. 2, with the result that the cotter is placed and maintained under constant spring pressure so that it will be retained in position.

When the pins become loose in the sidebars, the pins may rotate in the sidebars and the spring cotters will tend to bring the cotter holes in alignment and thus permit the cotter, of the type shown in Figs. 1 and 2, to move relative to the pins and work out of the cotter holes. Therefore, this type of cotter is only effective so long as the pins remain a tight fit in the sidebars and the cotter holes are in angular position with respect to each other. To overcome this difficulty, the cotters of the modified forms shown in the following Figs. 3 to 8, inclusive, are provided with additional locking means which will function to prevent the cotters from working out of their holes, even though the pins become loose in the sidebars and permit the pins to rotate placing the holes in alignment.

The modified form of cotter illustrated in Figs. 3 and 4 consists of a chain sidebar (A) of the same type as that illustrated in Figs. 1 and 2. This sidebar (A) has press fitted therein a chain or pintle pin (B') and a second chain or pintle pin (C'). These two pins have formed therein cotter holes (D') and (E') which are both inclined slightly with respect to a center line passing through both chain pins. Preferably, the angles of both of these slightly inclined holes (D') and (E') are the same. A cotter (F'), formed of a suitable length of spring steel wire is provided for insertion in both of the cotter holes (D') and (E'). This cotter (F') is provided with a tapered extremity (G'), a straight body portion (H') and a headed or hooked end portion (J'). This end portion (J'), preferably, takes the shape of a shepherd's crook.

When the cotter (F') is inserted through the hole (E'), to the position illustrated in Fig. 3, it becomes necessary to forcibly deflect the tapered extremity (G') until it registers with or will enter the inner or adjacent end of the hole (D') in the pin (B'). With the outer end of the cotter registering with the cotter hole (D'), driving of the cotter into its final, fully assembled position, will cause the cotter to be deflected throughout the entire portion of the same which extends between the outer sides of the pins (B') and (C'). The headed or hooked end (J') of the cotter also will be forced over the outer surface of the pin (C') with the result that this hooked end will function to lock and position the cotter in its final assembled relation with respect to both chain pins.

The form of the invention disclosed in Figs. 5 and 6 consists of the sidebar, chain or pintle pin, and cotter hole arrangement of Figs. 1 and 2. The same reference characters, therefore, will be applied to these three elements. The cotter (F'') of this form shown in Figs. 5 and 6 is provided with a tapered extremity (G''), a straight body portion (H'') and a headed or hooked end (J'') which takes the form of a shepherd's crook. This cotter, also, is formed of a suitable length section of spring steel wire. Due to the angular relation between the axes of the cotter holes (D) and (E), the driving of the cotter (H'') into the hole (D) will cause the outer end portion of the same to be deflected, as was described in connection with the cotter (F) of the form disclosed in Figs. 1 and 2.

In Figs. 7 and 8 there is disclosed a roller chain sidebar (A) with chain or pintle pins (B'') and (C'') projecting therefrom. The pin (B'') is provided with a cotter hole (D'') which is axially aligned with a center line passing through both of the chain pins. The inner end portion of this cotter hole (D'') is flared or beveled, as at (d), to more readily guide the adjacent end of its cotter when the latter is to be driven into the hole (D''). The pin (C'') is provided with a cotter hole (E'') which is axially aligned with the cotter hole (D''). The cotter (F''') is provided with a tapered extremity (G''') and an end portion (f) which is normally arranged at an obtuse angle with respect to the straight body portion (H'''). The other end of the body portion is provided with a headed or hook-shaped portion (J''') which also takes the form of a shepherd's crook. It is to be understood that this cotter (F''') is to be formed from a proper length section of spring steel wire.

When this cotter (F''') has its angularly arranged end portion (f) driven into the cotter hole (D'') of the pin (B''), the end portion (f) is deflected so that it is substantially axially aligned with the straight, main body portion (H''').

It will be noted that with all of the various forms of cotters illustrated, the axes of the cotter holes in the chain pins and the axes of the end portions of the cotter which are to be received in the cotter holes are normally angularly arranged relative to each other so as to cause the cotter to be deflected when the outer end portion of the cotter is driven into its respective cotter hole whereby the cotter is maintained under constant spring pressure in said holes. It further will be noted that in the forms of the invention shown in Figs. 1, 2, 5, 6, 7 and 8, the outer end portion of the cotter is deflected by its insertion in the cotter hole intended to receive the same. In the forms of the invention shown in Figs. 3 to 8, inclusive, the cotter is provided with a headed end, which takes the form of a shepherd's crook, which snaps over one of the chain or pintle pins to cause it to act as locking and positioning means for the cotter. Although the cotter hole (D') in Figs. 7 and 8 is the only one which is illustrated as being provided with a flared or beveled inner end, it is to be understood that the cotter holes in pins (B) and (B') of Figs. 1 to 6, inclusive, also may be provided with flared or beveled inner end portions if so desired. It will be appreciated that the angular arrangements of the axes of the cotter holes in the chain pins relative to the axes of the end portions of the cotters, prior to complete assembly of the cotters, will determine the character of deflection or bend which is placed in the cotters when they are completely assembled. Other arrangements than those illustrated in the several figures may be provided if desired. I, therefore, do not desire to be limited to the particular arrangements shown except in such instances as when certain arrangements are specifically claimed.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a cotter pin assembly, the combination with a sidebar and a pair of pins projecting through and tightly fitting holes formed in the sidebar with each of said pins having a cotter hole therein, of a single cotter formed of stiff resilient material for maintaining the sidebar and pair of pins in operative relation, the axes of the cotter holes and the axes of the end portions of the cotter being so misaligned relative to each other, when the entire length of the cotter axis and the axes of the cotter holes are positioned in a common plane which is parallel to the outer face of the side bar, as to cause deflection of the cotter within said common plane when driven longitudinally of the sidebar into said holes, whereby the cotter is maintained under constant spring pressure in said holes.

2. In a cotter pin assembly, the combination with a sidebar and a pair of pins projecting through and tightly fitting holes formed in the sidebar with each of said pins having a cotter hole therein, of a single cotter formed of stiff springy material for retaining the sidebar and pair of pins in operative relation, the axes of the cotter hole through one of said pins and the end portion of the cotter to be received in said hole being so misaligned relative to each other, when the entire length of the cotter axis and the axes of the cotter holes are positioned in a common plane which is parallel to the outer face of the sidebar and the cotter is driven longitudinally of the sidebar into the hole of the other pin and extends substantially longitudinally of the sidebar, that the cotter will be deflected within said common plane by its insertion into the cotter hole of the first pin, whereby the cotter is maintained under constant spring pressure in said holes.

3. In a cotter pin assembly, the combination with a sidebar and a pair of pins projecting through and tightly fitting holes formed in the sidebar, said pins having cotter holes formed therein with their axes extending substantially in the direction of the length of the sidebar, a single cotter formed of resilient material for retaining the sidebar and pair of pins in operative relation, the axes of the cotter hole through one of said pins and the end portion of the cotter to be received in said hole being so angularly arranged relative to each other, when positioned in a common plane parallel to the outer face of the sidebar and when the cotter is driven longitudinally of the sidebar into the hole of the other pin to extend substantially longitudinally of the sidebar, that the cotter will be deflectted within said common plane by its insertion into the cotter hole of the first pin, whereby the cotter will be maintained under constant spring pressure in said holes.

4. In a cotter pin assembly, the combination with a sidebar and a pair of pins projecting through and tightly fitting holes formed in the sidebar with each of said pins having a cotter hole therein, of a single cotter formed of stiff resilient material for retaining the sidebar and pair of pins in operative relation, the axes of the cotter hole through one of said pins and the end portion of the cotter to be received in said hole being so misaligned relative to each other, while positioned in a common plane parallel to the outer face of the sidebar and when the cotter is driven longitudinally of the sidebar into the hole of the other pin, that the cotter will be deflected within said common plane by its insertion into the cotter hole of the first pin, whereby the cotter is maintained under constant spring pressure in said holes, and means formed on one end of the cotter and cooperating with one of said pins for positioning and locking the cotter in said holes.

5. In a cotter pin assembly, the combination with a sidebar and a pair of pins projecting through and tightly fitting holes formed in the sidebar with each of said pins having a cotter hole formed therein, of a single cotter formed of stiff springy material for retaining the sidebar and pair of pins in operative relation, the axes of the cotter holes and the axes of the end portions of the cotter being so arranged relative to each other, when the entire length of the cotter axis and the axes of the cotter holes are positioned in a common plane which is parallel to the outer face of the side bar, as to cause deflection of the cotter within said common plane when driven longitudinally of the sidebar into said holes, whereby the cotter is maintained under constant spring pressure in said holes, said cotter having an end in the form of a shepherd's crook adapted to snap over one of said pins for positioning and locking the cotter in said holes.

6. In a cotter pin assembly, a sidebar, and a pair of pins projecting through and tightly fitting holes formed in the sidebar with each of said pins having a cotter hole therein, one of said cotter holes being set at an acute angle with respect to the center line passing through both of said chain pins and the other cotter hole being set at an angle which will cause a longitudinal projection of the same to register with the adjacent end of the first cotter hole, and a single cotter formed of stiff springy material for retaining the sidebar and pair of pins in operative relation, said cotter having a straight body portion which, when inserted in both of said cotter holes, will be deflected in a plane common to the entire length of the cotter and both cotter holes so that the cotter will be maintained under constant spring pressure in said holes.

7. In a cotter pin assembly, a sidebar, and a pair of pins projecting through and tightly fitting holes formed in the sidebar with each of said pins having a cotter hole therein, the axes of said cotter holes being arranged at an acute angle with respect to a center line passing through both pins and with said axes converging on one side of said center line, a single cotter formed of stiff springy material for retaining the sidebar and pair of pins in operative relation, said cotter having a straight body portion which, when inserted in both of said cotter holes, will be deflected in a plane common to the entire length of the cotter and both cotter holes so that the cotter will be maintained under constant spring pressure in said holes, and means formed on one end of the cotter and cooperating with one of said pins for positioning and locking the cotter in said holes.

8. In a cotter pin assembly, a sidebar, and a pair of pins projecting through and tightly fitting holes formed in the sidebar with each of said pins having a cotter hole therein, and with said cotter holes being arranged in axial alignment, a single cotter formed of stiff springy material for retaining the sidebar and pair of pins in operative relation, said cotter having a straight main body portion, an outer end portion arranged at an acute angle to said main body portion, and a hook-shaped inner end portion, the obtusely arranged outer end portion being deflected into alignment with the main body portion, when the cotter is driven into the aligned cotter holes, to maintain the cotter under constant spring pressure, and the hook-shaped end portion cooperating with one of said pins to position and lock the cotter in said holes.

JERRUS M. BRYANT.